United States Patent [19]

Brudevold

[11] 4,204,251
[45] May 20, 1980

[54] INTERCONNECTION UNIT FOR MULTIPLE DATA PROCESSING SYSTEMS

[76] Inventor: Finn Brudevold, 35 Fairbanks Ave., Wellesley, Mass. 02181

[21] Appl. No.: 865,116

[22] Filed: Dec. 28, 1977

[51] Int. Cl.² ............................................. G06F 15/16
[52] U.S. Cl. .................................................... 364/200
[58] Field of Search ... 364/200 MS File, 900 MS File

[56] References Cited

U.S. PATENT DOCUMENTS

| 3,400,372 | 9/1968 | Beausoleil et al. | 364/200 |
| 3,753,234 | 8/1973 | Gilbert et al. | 364/200 |
| 3,916,380 | 10/1975 | Fletcher et al. | 364/200 X |
| 3,940,743 | 2/1976 | Fitzgerald | 364/200 |
| 3,984,819 | 10/1976 | Anderson | 364/200 |

FOREIGN PATENT DOCUMENTS

| 932291 | 7/1963 | United Kingdom . |
| 1003641 | 9/1965 | United Kingdom . |
| 1057085 | 2/1967 | United Kingdom . |
| 1167762 | 10/1969 | United Kingdom . |
| 1190473 | 5/1970 | United Kingdom . |
| 1214615 | 12/1970 | United Kingdom . |
| 1225252 | 3/1971 | United Kingdom . |
| 1391996 | 4/1975 | United Kingdom . |
| 1490612 | 11/1977 | United Kingdom . |

Primary Examiner—Mark E. Nusbaum
Assistant Examiner—Thomas M. Heckler
Attorney, Agent, or Firm—Oblon, Fisher, Spivak, McClelland & Maier

[57] ABSTRACT

An interconnection unit for connecting multiple data processing systems in a distributed data processing network. The interconnection unit comprises a single controller with control and data sections that connect to each data processing system in the network through an interface circuit and a host processor interface circuit that connects to each data processing system. For one data processing system to transfer information to another system, the one system requests exclusive control of either the data or control section of the interconnection unit. Each section independently and sequentially tests each interface circuit to determine if a control request exists. When a section grants a request, the requesting data processing system transfers information to or from a memory in that section associated with another system in the network. That memory is accessible to all the data processing systems. The controller sends a signal to the other data processing system to notify it that pertinent information is stored in the memory. The other system then can request control of the interconnection unit and process that information.

20 Claims, 9 Drawing Figures

FIG 1

FIG 2A
CONTROL SECTION
CONTROL STATUS REGISTER 40

FIG 2B
CONTROL SECTION
DATA BUFFER 41

FIG 2C
DATA SECTION
CONTROL STATUS REGISTER 42

FIG 2D
DATA SECTION
DATA BUFFER

FIG 5
BUS CONTROL SECTION 23B

INTERCONNECTION UNIT FOR MULTIPLE DATA PROCESSING SYSTEMS

BACKGROUND OF THE INVENTION

This invention generally relates to data processing systems and more specifically to the interconnection of data processing systems in a distributed data processing network.

There are two basic terms that should be defined: namely, "file" and "distributed data processing system". A "file" is an organized collection of information directed to some purpose. For example, a file may comprise a set of program instructions for use by a data processing system or a block of data to be processed in response to instructions stored in some other file. In the context of this application a file is specified by a unique identifier. Typically, this identifier is a common name which the person forming the file assigns to it.

A "distributed data processing network" includes interconnected data processing systems. Such a network is characterized in that each data processing system operates independently of the other systems and yet has the capacity for transferring files with any other system in the network.

Data processing systems in the past have been interconnected to operate as distributed data processing networks. In the simplest network configuration, two data processing systems are interconnected by means of a linking circuit. This type of interconnection enables various devices to connect to each data processing system and operate independently with that system while the link transfers files between the systems. Thus, the files are stored redundantly. Such distributed data processing networks are called replicated networks. They are relatively simple to implement when two data processing systems are interconnected. However, if one attempts to construct a replicated network with three or more systems, the interconnection and the required control programming for operating the network becomes extraordinarily complex. Thus, replicated networks tend, from a practical standpoint, to be limited to networks that include only two independent data processing systems.

Another approach to interconnection of data processing systems in distributed data processing networks involves the interconnection of two or more data processing systems in a master-slave relationship. In one specific implementation, one data processing system performs solely as a master system. All the other data processing systems connect to the master system as slave systems. The master system controls any communications between the individual slave systems.

When the master system is a dedicated data processing system, however, much of the redundancy in the replicated system is lost. As will be apparent, if the master system malfunctions and ceases to operate, the entire network becomes inoperative. In another master-slave implementation, all the data processing systems are in parallel, but one system is additionally programmed to operate as the master system. This reduces the susceptibility to malfunctions because the master program may be transferred to any other data processing system in the network. However, the combined load on a data processing system additionally operating as the master system can overload the master system. Any such overloading that affects the operation of the master system slows the overall efficiency of the entire network.

In large and complex distributed data processing networks, individual data processing systems share all of the main random access memory or a portion of that memory. More specifically, complex switching circuits interconnect various memory modules that constitute the main memory, multiple central processing units and multiple input/output control units. These networks also require extensive control programming and require the arbitration of multiple concurrent requests for access to a particular memory from both the central processor units and the input/output units in order to avoid "race" problems in accessing the common portion of the main memory. This adds to the expense of the distributed data processing network.

As the control programs become more complex in all the foregoing approaches, they require more time to process. However, these control programs perform overhead operations that require time that therefor can not be allocated to processing programs that produce useful output. Increasing the time for processing these control programs therefore makes the data processing systems run significantly slower; that is, the processing time for programs in the distributed data processing network is greater than the time required if a single data processing system were to process the same program on a dedicated basis.

Therefore, it is an object of this invention to provide apparatus for interconnecting multiple data processing systems in a distributed data processing network.

Another object of this invention is to provide apparatus for interconnecting multiple data processing systems that comprises electronic circuitry that affords great flexibility in the preparation of control programs.

Still another object of this invention is to provide apparatus for interconnecting multiple data processing systems that are simple to implement and to utilize.

Yet another object of this invention is to provide apparatus for interconnecting multiple data processing systems that minimizes processing time for control programs.

SUMMARY

In accordance with this invention each data processing system in a distributed data processing network connects to an interconnection unit. If a particular data processing network requires a file to be transferred, it requests access to the interconnection unit. When that request is granted by the interconnection unit, exclusive control over the interconnection unit is transferred to the requesting data processing system. The requesting system then transfers information into a portion of a memory in the controller that can be accessed by all other data processing systems in the network. When the information is stored in the memory, the system with exclusive control can cause the interconnection unit to interrupt the operations of the system to which the information has been sent. In response the other system requests control over the interconnection unit thereby to retrieve and process the information.

This invention is pointed out with particularity in the appended claims. The above and further objects and advantages of this invention may be better understood by referring to the following detailed description taken in conjunction with the accompanying drawings.

DESCRIPTION OF AN ILLUSTRATIVE EMBODIMENT

1. General Discussion

Figure 1:
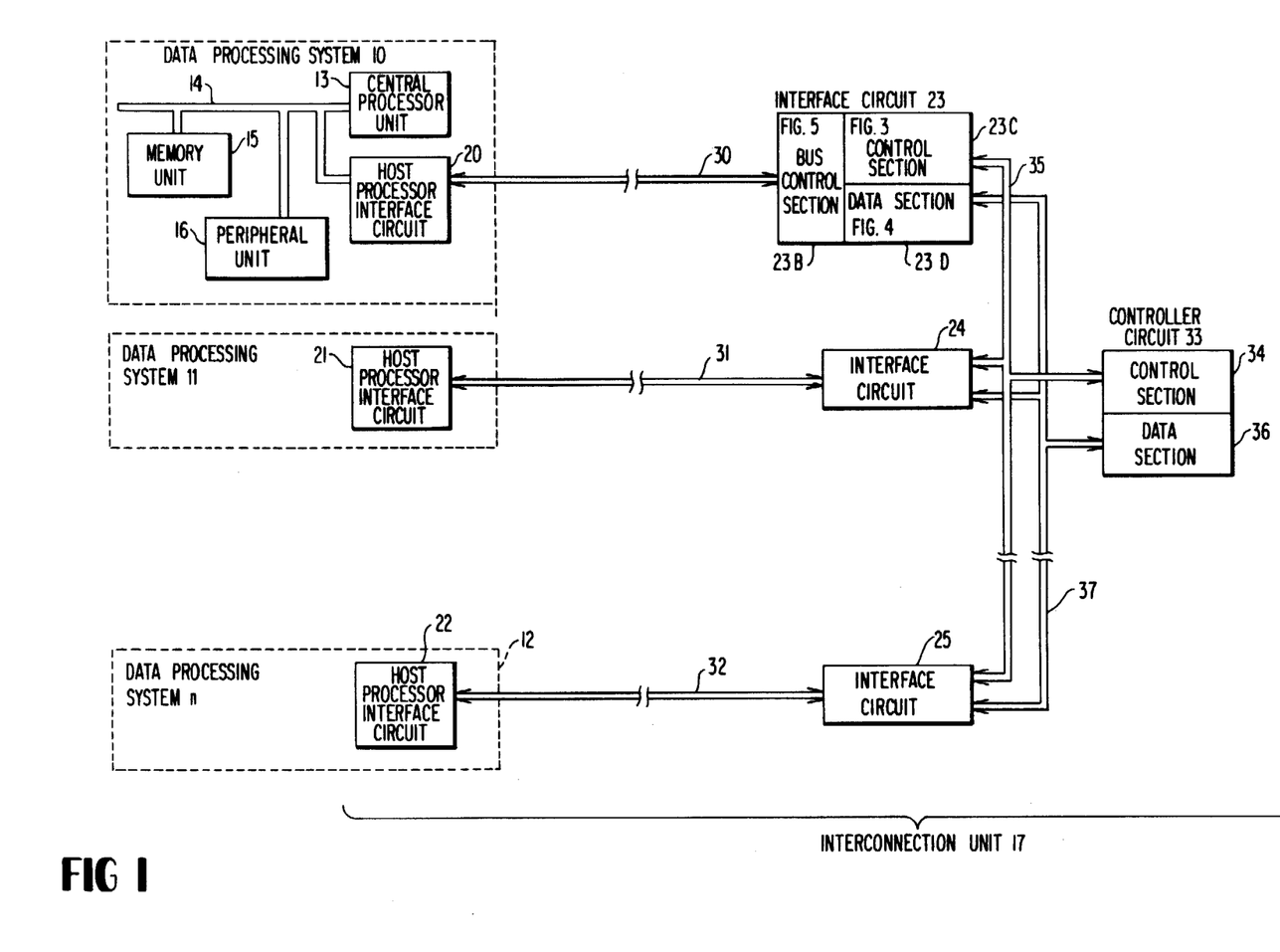
FIG. 1 is a block diagram of a distributed data processing network constructed in accordance with this invention.

A distributed data processing network shown in FIG. 1 comprises three data processing systems designated by reference numerals 10, 11 and 12. The system 12 represents data processing system "n" where "n" corresponds to the maximum number of data processing systems that can be connected in the network. The specific constrution of each data processing system in the network depends upon the particular application of that system. Typically, each data processing system will include, as a minimum, the units shown in the data processing system 10. These include a central processor unit 13 which communicates over a system bus 14 with a random access memory unit 15 and one or more peripheral units 16. A peripheral unit may comprise input-output devices such as teletypewriters and video display-keyboard devices, output devices such as line printers and secondary storage devices such as disk memories. The remaining data processing systems in FIG. 1 will have a similar structure.

Still referring to FIG. 1, an interconnection unit 17 constructed in accordance with this invention contains a number of circuits. A host processor interface circuit connects to each data processing system in the network. In FIG. 1, these are circuits 20, 21 and 22. Referring specifically to the host processor interface circuit 20, it connects to the system bus 14 and thereby interfaces the interconnection unit 17 with the data processing system 10. Each of the host processor interface circuits 20, 21 and 22 also connects to a corresponding one of interface circuits 23, 24 and 25 by means of buses 30, 31 and 32. Each interface circuit comprises several sections, and the interface circuit 23 is divided into those sections: namely, a bus control section 23B that connects to the bus 30, a control section 23C that connects to the bus control section 23B, and a data section 23D that also connects to the bus control section 23B.

Each of the control and data sections, such as sections 23C and 23D, connects to a controller circuit 33. The controller circuit 33 includes a control section 34, and a bus 35 connects the control section 34 to each interface circuit control section, such as control section 23C. Similarly, a data section 36 communicates with each interface circuit data section, such as the data section 23D, over a bus 37.

Each data processing system in the network shown in FIG. 1 operates independently of the other data processing systems. That is, each system responds to programs stored in its own memory and signals received from and transmitted to its own peripheral devices. However, the interconnection unit 17 is connected to all the data processing systems. Therefore, it enables any one data processing system, as a "requesting system", to transfer a file to or from any other system, as a "target system", in the network. A transfer is initiated when the requesting system requests control of either the control section 34 or the data section 36 in the interconnection unit 17. When the interconnection unit 17 grants control to the requesting system, the requesting system transfers the information to the corresponding one of the control and data sections 34 and 36. The requesting system then can interrupt operations of the target system.

For example, if the data processing system 10, as part of its operation, needs to transfer a file to the data processing system 11, it is a requesting system and issues a request for control over the control section 34. The host processor interface circuit 20 couples this request to the interface circuit 23 over the bus 30 and into the control section 23C. The control section 34 of the controller 36 artibrates concurrent requests for control and recognizes one such request. When the controller circuit 33 grants control to the system 10, the control section 34 and control section 23C transfer a signal back to the host processor interface 20 to indicate to the data processing system that it has exclusive control over the interconnection unit 17.

The data processing system 10 then specifies which data processing system, as a "target" system, is to receive the file and performs other control functions by transferring information to and from the control section 34, as the control section 34 contains information about each system in the network. Once all this information is transferred, the requesting system 10 relinquishes control of the control section 34 and requests exclusive control over the data section 36. An analogous process transfers exclusive control to the data processing system 10. Then the file to be transferred is routed through the host processor interface circuit 20, over the bus 30, through the bus control section 23B and data section 23D and over the bus 37 into the data section 36. Once the transfer is completed, the controller circuit 33 and interface circuit 24 interact to notify the target system, i.e., the data processing system 11, that the file is available.

The data processing system 11 then becomes a requesting system and obtains control of either the control section 34 or the data section 36 or both sections in sequence. Once control over the data section 36 had been obtained, the file is transferred from the data section 36 over the bus 37, through the interface circuit 24, over the bus 31 and through the host processor interface circuit 21 into the data processing system 11. Optionally, the data processing system 11 and the interconnection unit 17 could then interact to notify the data processing system 10 that the transfer had been completed.

Thus, the interconnection unit shown in FIG. 1 enables a requesting data processing system to gain exclusive control of and transfer information to the interconnection unit 17. The interconnection unit 17 buffers that information until the target system is notified and, as a requesting system, completes the transfer. While the data processing systems connected to the interconnection unit 17 operate independently of each other, the interconnection unit 17 thereby enables each system to transfer files with any other system in the network. The "radial" nature of the interconnection of the systems is apparent from FIG. 1. This radial configuration also enables the transfer to occur between two data processing systems independently of any other system in the network. Thus, the network shown in FIG. 1 is, according to the previous definition, a true distributed data processing network. Moreover, this result is achieved without any change in the structure of the individual data processing systems.

2. Description of a Specific Embodiment

In order to simplify the discussion of the concepts that underlie this invention and the implementation of this invention, it will be helpful to describe a specific embodiment of the invention. The following discussion therefor describes an interconnection unit 17 that operates with plural PDP11 data processing systems manufactured by Digital Equipment Corporation of Maynard, Mass.

a. System bus operations

Each PDP11 data processing system communicates with the interconnection unit 17 by performing bus reading and writing operations over its system bus that corresponds to the system bus 14. Whenever such communication is necessary, some unit in the system, normally the central processor unit 13, becomes a "master" unit. A master unit initiates a bus operation by first gaining control of the system bus 14. Then it transmits address and control signals onto the bus 14. The address signals identify a specific storage location in the memory unit 15 or any peripheral unit 16; that unit is a "slave" unit for the duration of the bus operation. Certain control signals called direction signals specify whether the bus operation is a reading or writing operation. If a writing operation is being performed, the master unit also transmits data onto the system bus 14 concurrently with the address and control information. Then the master unit transmits a master synchronizing signal. The slave unit responds to these signals by performing the specified operation and then transmitting back to the master unit a slave synchronizing signal that enables the master and slave units to complete the bus operation.

a. Control Status and Data Buffer Registers

Figure 3:
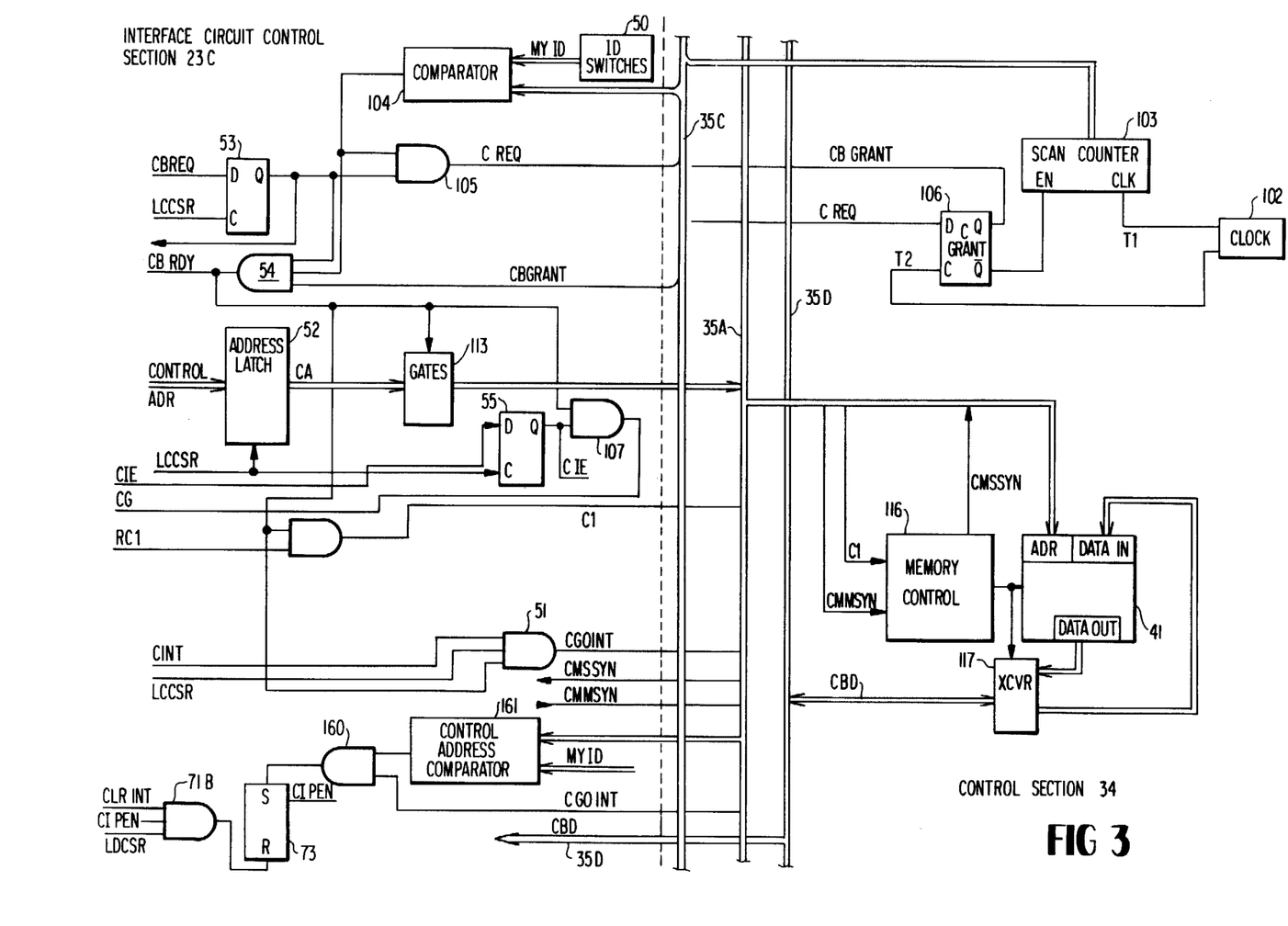
FIG. 3 is a detailed block diagram of the control section of the controller and corresponding control section of the interface circuit shown in FIG. 1.
Figure 4:
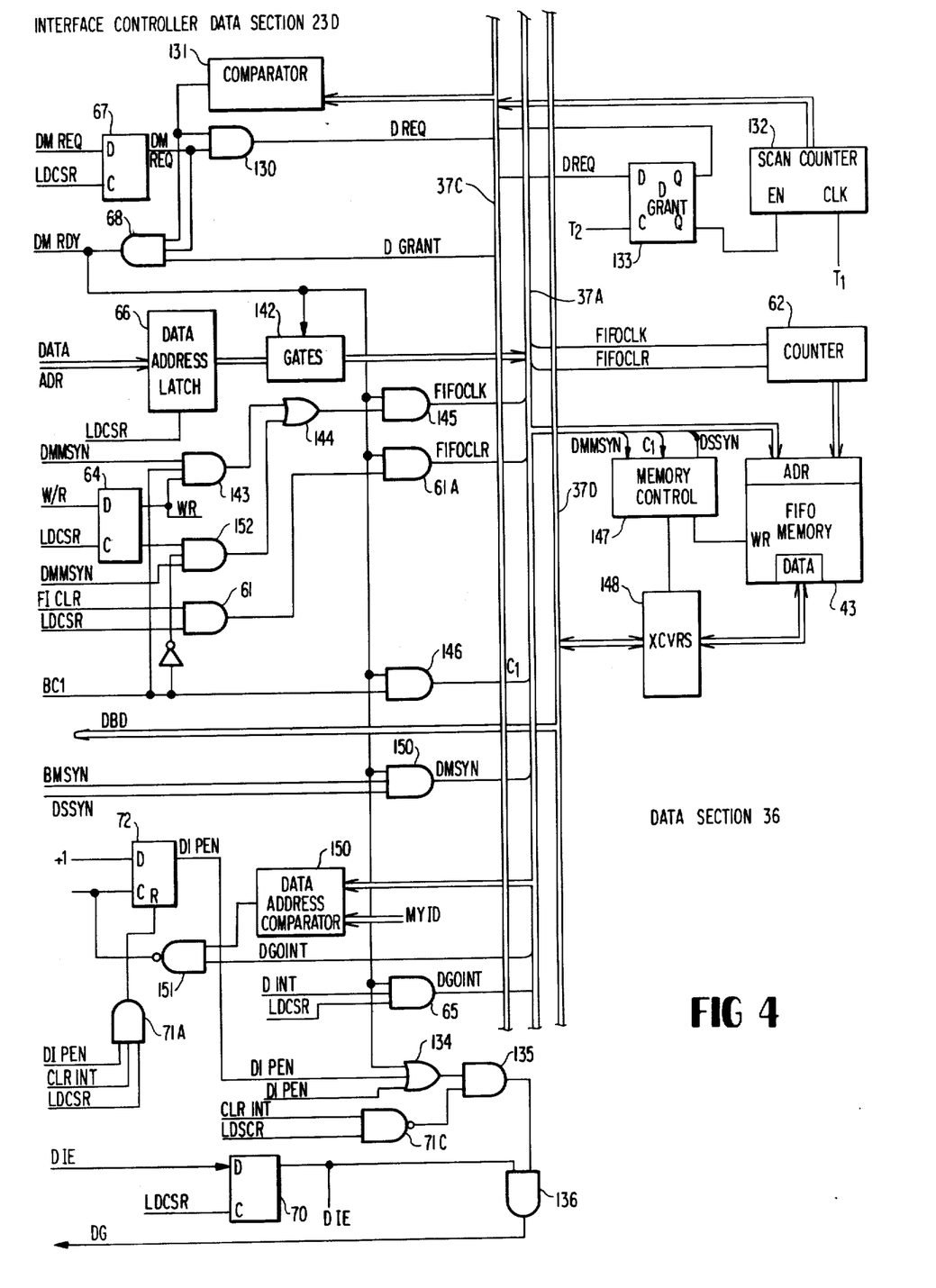
FIG. 4 is a detailed block diagram of the data section of the controller and corresponding data section of the interface circuit shown in FIG. 1.

The interconnection unit 17 contains a number of storage locations, or registers, that are accessible to each data processing system. Specifically, these locations comprise a set of four registers that are associated with each data processing system. The register set associated with the data processing system 10 is shown in FIG. 2; the register sets associated with the other systems would be identical. Each set includes a control status register 40 shown in FIG. 2A that contains various stages. These stages comprise circuitry in the control section 23C of the interface circuit 23 and are associated with the control section 34. FIG. 2B depicts a control section data buffer 41. This is a "fictitious" register as its address is decoded along with the direction signals to identify either the input port or output port of a memory 41 in the control section 34 (the same reference number identifies both the data buffer and the memory that is shown in FIG. 3). FIG. 2C depicts a data section control status register 42 that comprises circuitry in the data section 23D of the interface circuit 23 while FIG. 2D depicts a data buffer 43 that also is a fictitious register that corresponds to a memory 43 in the data section that is shown in FIG. 4.

Figure 2A:
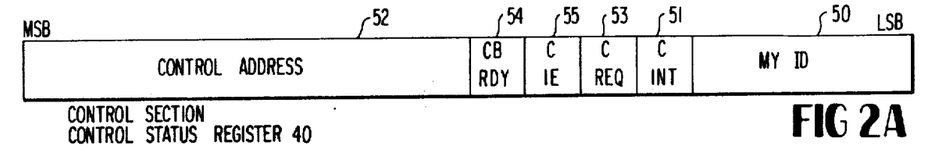
FIGS. 2A through 2D disclose four specific registers that are associated with each interface circuit shown in FIG. 1.
Figure 2B:
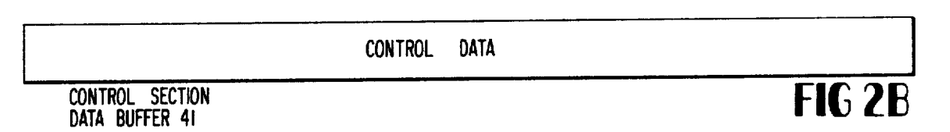
Figure 2C:
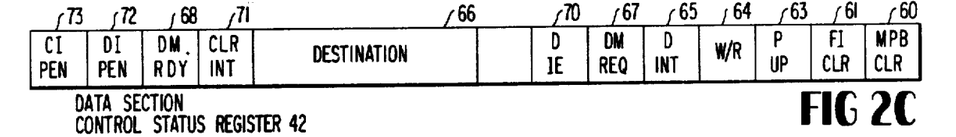
Figure 2D:
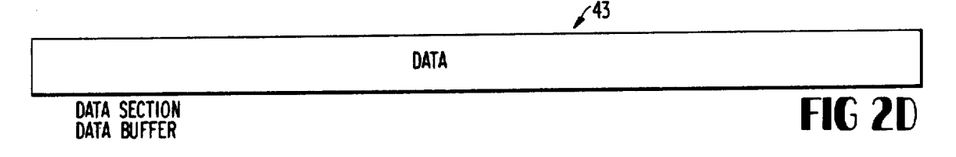

Referring to the control status register 40 shown in FIG. 2A, each control status register comprises a number of individual stages that are constituted by various flip-flops and gates in its respective interface unit control section. In this discussion of the function of each stage, the same reference numeral is used to identify the stage in FIG. 2 and to identify the specific circuit element in the other Figures that receives or transmits the corresponding signal. More specifically, the least significant stages of the control status register 40 are MY ID stages 50. These stages are read-only stages and reflect the signals transmitted by an ID SWITCHES circuit 50 shown in FIG. 3. The circuit 50 produces a unique combination of MY ID signals for each data processing system. In this specific example, there are four bits. Therefore, this specific embodiment of the interconnection unit 17 can accommodate up to sixteen data processing systems.

A C INT (control system interruption) stage 51 is a write-only stage and is constituted by a NAND gate 51 shown in FIG. 3. Whenever the signal in the C INT bit position is asserted during a bus writing operation to the register 40, the NAND gate 51 is energized. The interconnection unit 17 responds to the C INT signal by interrupting a data processing system that is specified by predetermined bit positions in CONTROL ADDRESS stages 52, these stages being constituted by an ADDRESS latch 52 in FIG. 3.

A flip-flop 53 in FIG. 3 constitutes a read-write C REQ (control section request) stage 53. When the data processing system 10 performs a bus writing operation that transfers data into the control status register 40 and sets the flip-flop 53, the interface circuit 23 establishes a request for control over the interconnection unit 17. When exclusive control is granted, an AND gate 54 (i.e., the read-only CB RDY stage) in FIG. 3 asserts a CB RDY (control bus ready) signal. If the data processing system 10 then performs a bus reading operation to retrieve the contents of the control status register 40, it will ascertain that it has exclusive control over the control section 34 of the interconnection unit 17.

A C IE (control section interruption enabling) stage 55 provides more efficient transfer of control to the data processing system. A flip-flop 55 in FIG. 3 constitutes the read-write C IE stage. If the C IE flip-flop 55 is set when the CB RDY signal is asserted, the control section 23C and the host processor interface circuit 20 interrupt the data processing system 10. This provides a positive indication to the system 10 that it has exclusive control over the interconnection unit 17.

The stages in the ADDRESS stages 52 are read-write latch. In addition to identifying a data processing system when the C INT signal is asserted, these stages provide an address for a particular storage location in the memory 41 that will be accessed during a bus operation involving the control data buffer 41.

As previously stated, the control section data buffer 41 is a fictitious register. When a master unit in the data processing system 10 issues an address that identifies this buffer, the interconnection unit 17 couples the location identified by the ADDRESS latch 52 to the data conductors in the bus 14.

Now referring to the data section control status register 42 shown in FIGS. 2C and 4, an MPB CLR stage 60 is a write-only stage. When set, it initializes the interconnection unit 17. Corresponding circuitry is not shown in FIG. 4.

A FI CLR stage 61 also is a write-only stage shown as an AND gate 61 in FIG. 4. When the AND gate 61 is energized, a counter 62 in FIG. 4 is set to an initial value.

A P UP stage 63 is a ready-only stage that is set if the controller circuit 33 is activated. This stage thereby enables a data processing system to determine whether the interconnection unit 17 is turned on and operating. Its specific circuitry is not shown.

A W/R stage 64 is a read-write stage that comprises a flip-flop 64 in FIG. 4. This stage controls, in combination with the direction signals, the incrementing of the counter 62 during transfers to and from the memory 43.

A D INT stage 65 is a write-only stage represented by an AND gate 65 in FIG. 4. When the AND gate 65 in one interface circuit is energized, another interface circuit connected to the data processing system identified in DESTINATION stages 66 interrupts that data processing system. The stages 66 are represented as a DATA ADDRESS latch 66 in FIG. 4. These stages also coact with signals from the counter 62 to identify unique storage locations in the memory 43.

A DM REQ stage 67 corresponds to the C REQ stage 53 and is a read-write stage constituted by a flip-flop 67 in FIG. 4. When the data processing system 10 performs a bus writing operation that transfers data into the control status register 42 and sets the flip-flop 67, circuitry in the data section 23D of the interface circuit 23 establishes a request for control over the data section 36 of the interconnection unit 17.

When exclusive control is granted, an AND gate 68 in FIG. 4 asserts a DM RDY signal. If the data processing system 10 then performs a bus reading operation with the control status register 42, it will ascertain that it has exclusive control over the control section 36 of the interconnection unit 17.

If a read-write D IE stage 70, represented as a flip-flop 70, is set, a number of conditions, including the energization of the AND gate 68, can enable the host processor interface unit 20 to interrupt the data processing system 10. Thus, once control is given to the data processing system, notification of that control can be sent back to the system in a positive manner.

A write-only CLR INT stage 71 comprising AND gates 71A (FIG. 4) and 71B (FIG. 3) and a NAND gate 71C (FIG. 4) clears certain interruption conditions when it is energized.

A read-only DI PEN stage 72 comprises a flip-flop 72 in FIG. 4. The flip-flop 72 is set by an interrupt command (i.e., the assertion of the D INT signal by another system) that also specifies the system 10. The DI PEN signal indicates that this interruption has been received and is pending. If the D IE flip-flop 70 also is set, the data processing system 10 is interrupted. If the CLR INT and DI PEN signals are asserted during a bus writing operation to the control status register 42, the AND gate 71A clears the flip-flop 72.

Similarly, a flip-flop 73 in FIG. 3 provides the signal for a read-only CI PEN stage 73. When the CI PEN flip-flop 73 and the D IE flip-flop 70 are both set, the data processing system 10 is interrupted. If the CLR INT and CI PEN signals are asserted during a bus writing operation to the control status register 42, the AND gate 71B clears the flip-flop 73.

c. Controller Memories

Now referring to the memories in the controller circuit 33 shown in FIG. 1, the memory 41 in FIG. 3 comprises a number of storage locations. In this specific embodiment, the CONTROL ADDRESS latch 52 contains eight stages so that any one of 256 storage locations can be specified. With the foregoing limit of sixteen data processing systems in a network, there are sixteen storage locations in the memory 41 allocated each data processing system. These storage registers contain status and control information that is useful during the transfer of files. These storage locations might include, for example, information that indicates whether the memory 43 shown in FIG. 4 is full or empty. Other information might include the identification of a requesting data processing system.

The memory 43, on the other hand, comprises blocks of locations which correspond to a convenient data block size. In a PDP11 data processing system, files are stored in disk memory units. The basic block of data in such disk memory units is a sector having 256 words. Therefore, the memory 43 comprises 4096 storage locations, and 256 storage locations are assigned to each data processing system.

d. Data paths

Figure 5:
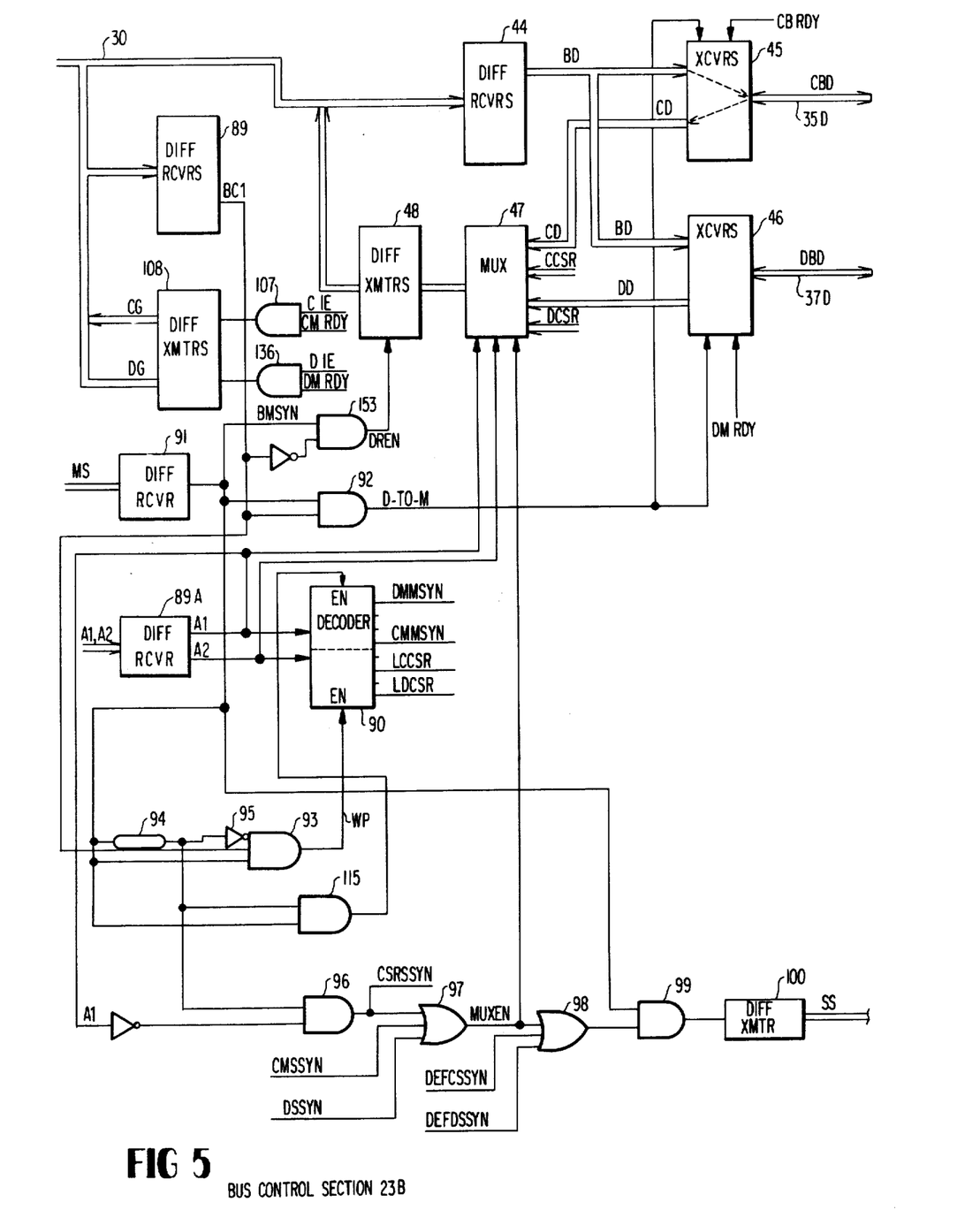
FIG. 5 is a detailed block diagram of the bus control section of the interface circuit shown in FIG. 1.

FIG. 5 depicts data paths through the bus control section 23B of the interface circuit 23 shown in FIG. 1. All the interface circuits have the same data paths. In accordance with this embodiment, signals are transferred between the host processor interface circuits and corresponding interface circuits by using differential signal transfers. During a bus writing operation to one of the registers shown in FIG. 2, incoming data signals on the bus 30 energize differential receivers 44. BD (bus data) signals from the receivers 44 pass through either a transceiver circuit 45 as CBD (control bus data) signals to the data section 35D of the bus 35 or a transceiver circuit 46 as DBD (data bus data) signals to the data section 37D of the bus 37. During a bus reading operation from any of the registers in FIG. 2, incoming CBD and DBD signals pass through the respective transceivers 45 and 46 to a four-input multiplexer 47 as CD (control section data) and DD (data section data) signals respectively. The other multiplexer inputs receive CCSR (control section control status register) and DCSR (data section control status register) signals respectively. Address (A1 and A2) signals select which multiplexer input signals will be coupled through the multiplexer 47 to differential transmitters when an MUXEN signal is asserted. The differential transmitters 48 transmit the selected signals onto the bus 30 in response to a DREN (data read enable) signal.

3. Operation of A Specific Embodiment a. Transferring Control to a Requesting Data Processing System The circuitry shown in the various Figures now can be described in detail with reference to the steps for transferring a file from the data processing system 10 as a requesting system to the data processing system 11 as a target system. File transfers between other systems will be performed in the same or a similar manner.

The data processing system 10 initiates the transfer by obtaining control of control and data sections 34 and 36 in sequence. Although the following discussion sets forth an operation without considering other simultaneous file transfers, it will become apparent that the control and data sections are independent. By "independent" I mean that the two sections operate separately, so it is possible for the control section to be under exclusive control of one data processing system while the data section is under the exclusive control of another data processing system.

A file transfer is initiated when the requesting data processing system 10 performs a bus writing operation to the control status register 40 in the control section 23C of the interface circuit 23. During this bus writing operation, the C INT stage 51 and the CONTROL ADDRESS stages 52 are not be used. The C REQ stage 53 is set. For purposes of this explanation, it also will be assumed that the C IE stage 54 also is set. When the central processor unit 13 initiates the bus writing operation, it asserts a BC1 signal indicating a writing operation and a master synchronizing (BMSYN) signal in addition to the data and the address for the control status register 40.

Figure 6:
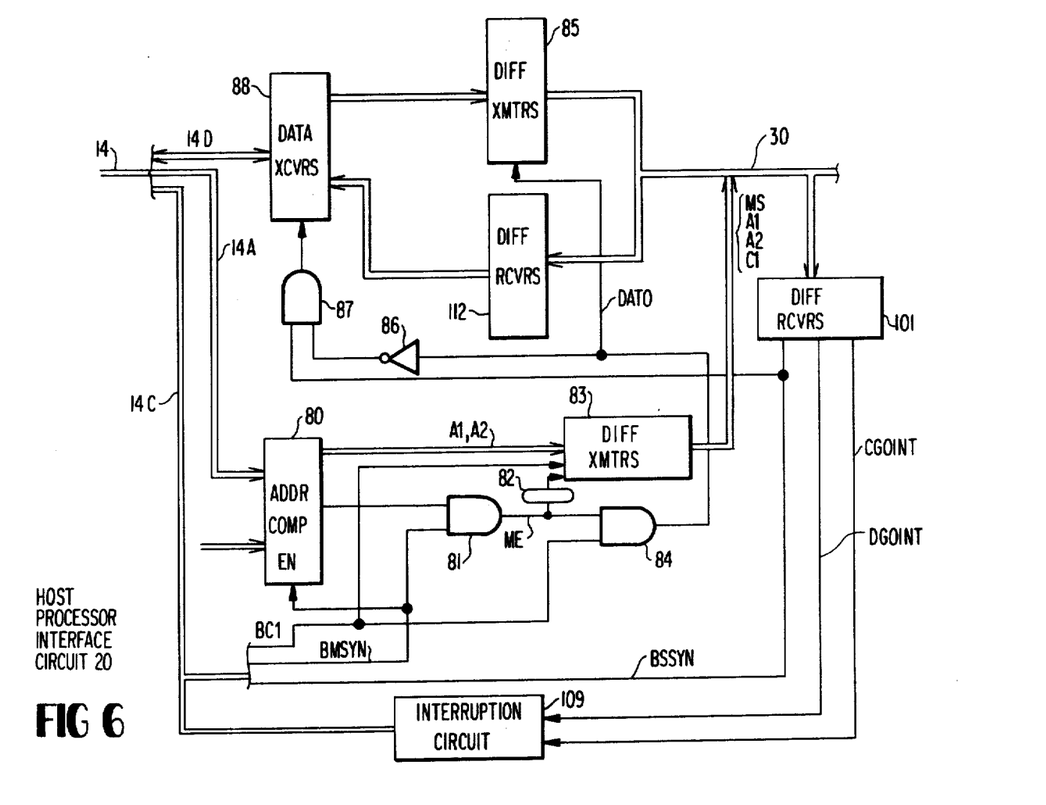
FIG. 6 is a detailed block diagram of a host processor interface circuit shown in FIG. 1.

These signals are received by the host processor interface circuit 20 shown in detail in FIG. 6. The address signals are conveyed to an address comparator 80 over address conductors 14A and control conductors 14C in the bus 14. The master synchronizing (BMSYN) signal enables the address comparator 80 to produce an output signal if the incoming address signals on conductors 14A correspond to any of the predetermined addresses for the registers shown in FIG. 2. If one of the four addresses is received, the address comparator 80 and the BMYSN signal energize an AND gate 81 thereby to transmit an ME signal.

The ME signal is conveyed through a delay circuit 82 to differential transmitters 83 to appear as MS signals on the bus 30. The ME signal also is conveyed to an AND gate 84 that is energized by the asserted BC1 signal during a writing operation to transmit a DATO signal. The DATO signal from the AND gate 84 during each bus writing operation conditions differential transmitters 85 to couple signals from the data conductors 14D in the bus 14 onto data conductors in the bus 30. The DATO signal also controls, through an inverter 86 and an AND gate 87, the transfer of data signals through driving circuits in data transceivers 88 during bus reading operations.

The differential transmitters 83 also convey low-order address signals A1 and A2 to identify one of the four registers and a C1 signal, derived from the BC1 signal, onto corresponding conductors in the bus 30 during bus reading and writing operations.

At the bus control section 23C of the interface circuit 23 shown in FIG. 5, differential receivers 89A pass the A1 and A2 address signals to a decoder 90. Differential signals produced by the MS signals pass through a differential receiver 91 to form the BMSYN signal. When the BC1 signal is active during a writing operation, an AND gate 92 transmits a D-TO-M control signal. This signal conditions the transceivers 45 and 46 to convey the signals from the differential receivers 44 onto either the CBD conductors 35D or the DBD conductors 37D if the CB RDY or the DM RDY signal is asserted.

The BMSYN signal controls the output signal from the decoder 90. During a bus writing operation an AND gate 93 produces a writing pulse (WP). More specifically, the BC1 signal from the differential receivers 89 and the BMSYN signal from the differential receivers 91 energize the AND gate 93 until a delay circuit 94 disables the AND gate 93 through an inverter 95. The resulting writing pulse enables the decoder 90 to produce either an LCCSR or LDCSR pulse depending upon the address signals from the differential receivers 89A. In this case the decoder 90 transmits an LCCSR pulse that loads the various read-write and write-only stages of the control status register 40.

The signal from the delay circuit 94 and the A1 signal that specifies the control status register 40 energize an AND gate 96 that produces a CSRSSYN signal. This signal is coupled through OR gates 97 and 98 and through an AND gate 99 that is enabled by the BMSYN signal. The AND gate 99 energizes differential transmitters 100 thereby to produce SS signals that are conveyed back to the host processor interface circuit 20 in FIG. 6. Differential receivers 101 couple the SS signals onto the bus 14 as a BSSYN signal. As known, the BMSYN signal then will terminate and the AND gate 99 in FIG. 5 will then terminate the SS signals. This completes the bus writing operation. Once this bus writing operation is completed, the data processing system can begin to process some other program.

Referring again to FIG. 3, a clock 102 produces T1 and T2 timing pulses that are displaced in phase. Each T1 pulse is applied to a clocking (CLK) input of a counter 103 which has a modulus corresponding to the number of data processing systems connected in the data processing network. In this specific embodiment the modulus is 16. Comparators in each interface circuit, such as the comparator 104 in FIG. 3, receive the output signals from the counter 103. When the counter 103 generates a number corresponding to the identity of data processing system 10, the comparator 104 energizes an AND gate 105 that is enabled when the flip-flop 53 is set. The AND gate 105 transmits a C REQ signal onto a corresponding one of the conductors 35C.

This C REQ signal conditions a C GRANT flip-flop 106 in the control section 34 to be set by the next T2 pulse from the clock 102. When this flip-flop sets, it generates a C GRANT signal and disables the counter 103 so the counter 103 can not increment to any successive number. The C GRANT signal is coupled back to all the interface circuits over a corresponding one of the conductors 35C and energizes the AND gate 54 in the interface circuit 23 when that gate is enabled by the flip-flop 53 and the comparator 104 thereby to transmit the CB RDY signal. The assertion of the CB RDY signal therefore indicates that exclusive control over the control section 34 has been assigned to the data processing system 10.

A positive notification of the transfer of control is assured if the C IE stage 55 is set. If it is, the CB RDY signal energizes an AND gate 107 that is shown in both FIGS. 3 and 5. As shown in FIG. 5, the AND gate 107 energizes differential transmitters 108 to transmit CG signals onto the bus 30. Differential receivers 101 at the host processor interface circuit 20 in FIG. 6 produce a CGOINT signal in response to the CG signals. The CGOINT signal is one input to a dual interruption circuit 109 that responds to the CGOINT signal by interrupting the operation of the data processing systems. The interruption circuit 109 is a conventional circuit that is used with PDP11 data processing systems so it is not disclosed in any detail.

b. Determination of Target System Status

Normally the data processing system 10 will process any such interruption by determining whether the portion of the memory 43 in FIG. 4 that is allocated to the target system is full. As previously indicated, one location corresponding to each of the data processing systems in the memory 41 contains that information. The central processor unit 13 in FIG. 1 obtains this status information by reading the information stored in that storage location during a bus reading operation.

It is possible for the bus writing operation that produces the request to simultaneously load the address of the storage location into the ADDRESS latch 52 in FIG. 3. If that is not done, then the reading operation must be preceeded by another bus writing operation. During such a bus writing operation, the central processor unit 13 transmits onto the data conductors 14D signals corresponding to the memory address and the C REQ signal. The appearance of the C REQ signal during the writing operation maintains the stage 53 in a set state to retain control over the interconnection unit 17. In either case, so long as the CB RDY signal from stage 54 is asserted, gates 113 couple the address signals over address conductors 35A to an address port of the memory 41.

When the data processing system 10 performs a bus reading operation, it addresses the control data buffer 41. Also the BC1 signal is inactive, so the AND gate 84 in FIG. 6 is not energized and the DATO signal is inactive. Thus, the differential transmitters 85 are inactive while the data transceivers 88 are conditioned to convey signals from differential receivers 112 onto the conductors 14D upon receipt of the BSSYN signal. The A1 and A2 address signals from the differential receivers 89A in FIG. 5 now condition the decoder 90 so that it transmits a CMMSYN signal upon receiving BMSYN signal from the differential receivers 91. More specifically, when the address signals identify either of the data buffers, the decoder 90 can not transmit either the LCCSR or LDCSR signals that load information into the control status registers 40 and 42 respectively. However, an AND gate 115 is energized during either reading or writing operations by the BMSYN signal after the delay determined by the delay circuit 94. In this case, the decoder 90 transmits a delayed CMMSYN signal that is transmitted onto a corresponding one of the conductors 35A.

This CMMSYN signal then is conveyed to a memory control circuit 116 in the control section 34 of FIG. 3. As the C1 signal is inactive during the reading operation, the data in the addressed location is retrieved and produced at an output port of the memory 41 and then conveyed through transceivers 117 onto conductors 35D as CBD signals. After an interval established by the time that is necessary to retrieve information from the memory 41, the memory control circuit 116 transmits a CMSSYN signal onto the bus section 35A. This signal is conveyed to the OR gate 97 in FIG. 5. When the OR gate 97 is energized, it transmits the MUXEN signal that enables the multiplexer 47 to couple the signals from the CBD conductors 35D to the bus 30. As previously described, the OR gates 97 and 98 and the AND gate 99 cause the differential transmitter 100 to generate the SS signal thereby to terminate the bus reading operation.

If a data processing system attempts to access the memory 41 in FIG. 3 while it does not control the control section 34, circuitry, that is not shown, generates a DEFCSSYN signal as a default slave synchronizing signal. Likewise, an attempt to access the memory 43 in FIG. 4 will produce a DEFDSSYN signal. Either signal also will energize the OR gate 98 thereby to terminate the bus operation. As apparent, the data involved in any such transfer will have a zero value.

c. Releasing Exclusive Control of the Interconnection Unit

Once the foregoing bus reading and writing operations and any other necessary information transfers with the control section have been completed, the central processor 13 releases its control over the interconnection unit 17. This is done by performing another bus writing operation to the control status register 40. This writing operation, however, clears the C REQ stage 53 in FIG. 3. As a result, the flip-flop 53 is cleared and the AND gate 105 is deenergized. This shifts the C REQ signal from the AND gate 105 to a non-asserted state, so the next T2 timing pulse from the clock 103 clears the flip-flop 106 thereby terminating the CBGRANT signal. When the CBGRANT signal shifts to a non-asserted level, it enables the counter 103 to respond to T1 pulses from the clock 102. Thus, the counter 103 identifies successive data processing systems until it identifies a system in which the C REQ signal is active whereupon control is passed to that data processing system.

d. Transferring a File to the Memory 43

The next step in transferring data to the memory 43 in FIG. 4 is to obtain exclusive control over the data section 36. The central procesor unit 13, or other master unit, obtains control by performing a bus writing operation to the data section control status register 42. The signals that are transmitted in conjunction with this operation are conveyed through the host processor interface 20 in FIG. 6 and are received by the circuitry in FIG. 5. The A1 and A2 signals now identify the register 42, so the decoder 90 transmits the LDCSR pulse that is applied to the circuitry corresponding to the write-only and read-write stages of the register 42.

Referring to FIG. 2C, the data transmitted from the central processor unit 13 will include a signal for setting the W/R stage 64 thereby to indicate that data will be written into the memory 43, a signal for setting the DM REQ stage 67 and a signal for setting the D IE stage 70. The identification number for the target data processing system will appear in the destination stages 66.

When the flip-flop 67 in FIG. 4 sets, it enables an AND gate 130. The data section 36 also contains a counter 132 that is enabled so long as a D GRANT flip-flop 133 is cleared. Each T1 signal from the clock 192 shown in FIG. 3 advances the counter. When the number in the counter 132 corresponds to the number in a particular interface controller data section, a comparator such as the comparator 131 in FIG. 4 energizes the AND gate 130 if the flip-flop 67 is set. The AND gate 130 transmits a D REQ signal onto conductors 37C. This signal is received by the flip-flop 133 which is then set on the subsequent T2 pulse thereby to prevent any further advance of the counter 132. The D GRANT signal from the flip-flop 133 is then coupled back over the conductors 37C to energize the AND gate 68 that is enabled by the flip-flop 67 and the comparator 131 to transmit the DM RDY signal.

If the flip-flop 70 in FIG. 4 is set, it indicates that interrupts are enabled. The DM RDY signal energizes an OR gate 134. The NAND gate 71C enables the AND gate 135 to be energized so that an AND gate 136, also shown in FIG. 5, causes DG signals to be transmitted onto the conductors 30. The differential receivers 101 in FIG. 6 receive the DG signals and transmit a DGOINT signal that is applied to the interruption circuit 109 thereby to interrupt the data processing system 10.

If the DATA ADDRESS latch 66 in FIG. 4 contains the number of the target system, gates 142 couple the destination code onto conductors 37A. These signals are then coupled into high-order bit positions of the address (ADR) port of the memory 43. The counter 62 provides the remaining address bits. Thus, if the memory 43 has 256 storage locations allocated to each data processing system, the counter 62 will be an eight-bit counter.

Normally this bus writing operation also will be used to assure that the counter 62 in FIG. 4 is cleared. This is accomplished by setting the FICLR stage represented by an AND gate 61. When this gate is energized, another AND gate 61A that is enabled by the DM RDY signal from the AND gate 68 is energized thereby producing a FIFOCLR signal that is conveyed to a clearing input of the counter 62.

Once the requesting data processing system has control of the data section, the requesting data processing system then transfers data words in succession into the memory 43. During each such transfer, the master unit transmits the address of the fictitious data buffer 43 onto the address conductors 14A. The host processor interface circuit 20 also produces the ME signal that is coupled to the bus control section over the bus 30. At the bus control section 23B shown in FIG. 5, the combination of the BMSYN signal from the differential receivers 91 and the A1 and A2 signals from the differential receivers 89A condition the decoder 90 to transmit a DMMSYN pulse.

During a writing operation, the latch 64 in FIG. 4 is set so each DMMSYN signal energizes an AND gate 143 if the BC1 signal is asserted. An OR gate 144 and an AND gate 145, that is enabled by the DM RDY signal from the AND gate 66, transmit an FIFOCLK pulse which is applied to the counter 62 in the data section 36. Thus, after the completion of each transfer into the memory 43, the counter 62 is incremented to identify the next location.

The C1 signal derived from the BC1 signal on the bus 14 energizes an AND gate 146 and this signal is coupled to a memory control 147 in the data section 36. The memory control 147 conditions the memory 43 to perform a writing operation and conditions transceivers 148 to couple data from data conductors 37D into the data port of the memory 43. At the conclusion of each memory operation, the memory control 147 transmits a DSSYN signal that energizes the OR gate 97 shown in FIG. 5 thereby to enable the differential transmitters 100 to transmit the SS signal that is sent back to the data processing system as the slave synchronizing signal. This succession of steps continues until all the words to be transferred, normally the words in one sector, are loaded into the memory 43.

When this transfer of data into the memory 43 is complete, the requesting data processing system normally will be programmed to interrupt the target data processing system 11. This is accomplished when the requesting data processing system performs another bus writing operation to the control status register 42 shown in FIG. 2. The writing operation normally will involve the transfer of signals only into the D INT, D IE and DM REQ stages, as the information in the description stages 66 in FIG. 4 usually identifies the target system. At this time, the gates 142 transfer the destination onto the conductors 37A. Thus, when the bus writing operation is being performed, the AND gate 65 transmits the DGOINT signal onto conductors 37A.

To understand the operation of the target data processing system in response to a bus writing operation that produces an interruption, reference is still made to FIG. 4 assuming now that the interface controller shown in FIG. 4 is connected to the target data processing system rather than the requesting data processing system. All the circuitry shown in FIG. 4 that is associated with each interface unit receives the address and DGOINT signals. Each data section additionally contains a data address comparator, such as the data address comparator 150 shown in FIG. 4, that responds to the receipt of its own address from the conductors 37A. When the ADDRESS signals identify the corresponding data processing system, the data address comparator 150 enables a NAND gate 151 so that the trailing edge of the DGOINT signal from the bus 37A sets the DI PEN flip-flop 72. The resulting DI PEN signal energizes the OR gate 134 so the AND gates 135 and 136 produce the DG signal. As previously described, this interrupts the system connected to the interface circuit, in this case the target data processing system. Therefore, this circuitry enables a cross interruption to be performed.

Once the interruption of the target system has been completed, the requesting data processing system releases the data section 36. This is accomplished by performing another bus writing operation to the control status register 42, this time, however, clearing the DM REQ stage 67, so the flip-flop 67 is cleared and the AND gate 130 is de-energized. As a result the next T2 pulse clears the D GRANT flip-flop 133 and enables the counter 132 to advance to the next number in sequence. Clearing the DGRANT flip-flop 133 also disables the AND gate 68 thereby terminating the DM RDY signal and all the gates that transfer data onto the conductors 37.

e. Transferring a file from the memory 43

In response to this interruption, the target data processing system processes an interruption routine which performs a number of operations. Initially, the target data processing system receives certain control information from the memory 41. This is accomplished when the target central processor unit performs a bus writing operation to gain control over the control section 34 as previously described. Once control is granted to the target data processing system, it can read appropriate ones of the storage locations in its memory correponding to the memory 41 in FIG. 3 and then can interpret that information. More specifically, the central processor unit performs a bus writing operation to load the address of the control status register 42 into the address latches corresponding to the latches 52 shown in FIG. 3 and to keep the latch 53 set.

Next the target data processing system performs a bus reading operation identifying the control section data buffer 41 on the address conductors 14A. In response to this operation, the decoder 90 in FIG. 5 produces a CMMSYN pulse in response to the BMSYN signal from the differential receivers 91 and A1 and A2 address signals from the differential receivers 89A. Referring to FIG. 3, the CMMSYN pulse is coupled onto conductors 35A and then to the memory control 116 thereby to couple the output data from the memory 41 onto the conductors 35D through the transceivers 117. During a reading operation the AND gate 92 in FIG. 5 is de-energized while an AND gate 153 transmits a DREN signal. With the AND gate 92 de-energized, the transceivers 45 and 46 are conditioned to transfer data from the memories 41 and 43 back onto the bus 30. In this case, the CB RDY signal is active so these signals are coupled through the transceiver 45 to the multiplexer 47. With the combination of the A1 and A2 signals as well as the MUXEN signal from the OR gate 97 in response to the CMSSYN signal, the multiplexer 47 conveys signals to the differential transmitters 48 that are energized in response to the DREN signal from the AND gate 153 thereby to transfer the data from the corresponding storage location in the memory 41 onto the conductors 30. Once this is completed, the target central processor unit performs another bus writing operation to clear the stage 53 and thereby release its control over the interconnection unit 17.

Next the target data processing system obtains control of the data section 36 shown in FIG. 4 as previously described. Then the system performs a sequence of bus reading operations from the fictitious data buffer 42. During each successive reading operation, the decoder 90 in FIG. 5, transmits the DMMSYN pulse. In addition the AND gate 153 is energized while the AND gate 92 is not energized.

Referring to FIG. 4, the DMMSYN signal energizes an AND gate 152 enabled because the WR stage 64 is cleared and the BC1 signal is not asserted during a reading operation. This enables the OR gate 144 and AND gate 145 to transmit the FIFOCLK pulses to increment the counter 62 thereby to identify successive locations. The high-order bits designating the target system will be transmitted into the data address latches 66. During each transfer, the data passes from the memory 43 and transceivers 148 onto conductors 37D. As shown in FIG. 5, these DBD signals are received by transceivers 46 that are conditioned to couple data into the multiplexer 47. As the data buffer is addressed, the multiplexer 47 is conditioned to couple the DD signals from the transceivers 46 to the differential transmitters 48, these transmitters having been turned on by the DREN signal from the AND gate 153.

Once all the data has been transferred, the target data processing system performs another bus writing operation thereby to clear the DM REQ stage 67 and terminates its exclusive control over the data section of the interconnection unit 17.

During a typical file transfer sequence, the target data processing system again requests control over the control section 34 to clear any bits that indicate that its buffer is full thereby to allow other data processing systems to transfer files to it. It might also transfer information into a location in the memory 41 corresponding to the requesting central processor unit in order to positively acknowledge its receipt of the file. If such an exchange occurs, then a data writing operation to the control section data buffer 41 occurs. After this information is stored in the memory 41 the target system performs another bus writing operation to its control status register 40 to transfer to the latch 52 the number of the requesting system and to transfer a C INT signal to the C INT stage 51.

Referring to FIG. 3, a NAND gate corresponding to the NAND gate 51 transmits the CGOINT signal that is received by an AND gate 160. As previously described with respect to the DI PEN latch 72 in FIG. 4, each interface control section contains a control address comparator 161. The requesting data processing system will receive the address from the target system and energize the AND gate 160 thereby setting the latch 73. Referring to FIG. 4, the CI PEN signal from the latch 73 then energizes the OR gate 134 and produces the DG signals that interrupt the requesting data processing system.

The DI PEN latch 72 in FIG. 4 and the CI PEN latch 73 in FIG. 3 are cleared after the interruption sequences have been performed. To clear the CI PEN latch 73 in FIG. 3, the data processing system that receives the interrupt performs a bus writing operation to address the control status register 42. The data that is transmitted to this register sets the CLR INT stage 71 and the CI PEN stage 73. As a result, the AND gate 71B resets the latch 73. Likewise, the a bus writing operation to the control status register 42 which sets the CLR INT stage 71 and the DI PEN stage 72 causes the AND gate 71A to clear the latch 72.

In summary, there has been disclosed a specific embodiment of an interconnection unit which enables a number of independent data processing systems to operate together as a distributed data processing network and in which the individual data processing systems can be located at physically remote locations. The interconnection unit has two basic sections: a control section and a data section. Each section connects to all the data processing systems in the network and each data processing network can access the data and control sections independently through bus writing operations. Counters in the controller grant exclusive control of the data and control sections to one requesting data processing system at a time. While a data processing system has control over a corresponding section, it can transfer information into or retrieve information from storage locations in the controller circuit that are assigned to it or to any other data processing system in the network. In addition, each data processing system can interrupt the operations of any other data processing system. These controls therefore enable the operation of each data processing independently while facilitating the transfer of files between those data processing systems as necessary.

The foregoing interconnection unit has been described with repect to a particular embodiment that is adapted for use with a specific data processing system. It wll be apparent, however, that other embodiments of this invention can be produced with the attainment of some or all of the foregoing advantages. For example, if all the data processing systems will be located in physical proximity, the differential transmitting and receiving functions performed by the host processor interface and interface circuits can be eliminated. In such a configuration, the remaining functions could be combined in one interface circuit thereby eliminating the discrete circuits shown in FIG. 1. Also, separate memories have been shown in association with each of the sections. Although this arrangement provides a very efficient operation because the control and data sections are completely independent, the memories could be combined. It is possible to allocate specific locations for each system; however, in some networks the allocations can be made on a dynamic basis. Moreover, with other modifications, the specific embodiment can be adapted for operation with other data processing systems. Therefore, it is the object of the appended claims to cover all such variations and modifications as come within the true spirit and scope of this invention.

What I claim as new and desire to secure by Letters Patent of the United States is:

1. An interconnection unit for interconnecting a plurality of data processing systems wherein each data processing system includes file storage means for storing blocks of information as files and system transfer means connected to the file storage means for controlling transfers of information, including the file information and control request information, between the system transfer means and said interconnection unit, said interconnection unit comprising:

A. a plurality of first signal transfer means, each said first signal transfer means being connectible to the system transfer means in one of the data processing systems for receiving informaton from and transferring information to the system transfer means in the one data processing system, B. request selection means connected to the plurality of said first signal transfer means for transferring exclusive control of said interconnection unit to one of the data processing systems in response to the coincidence of the receipt of request control information in said first transfer means from the data processing system connected thereto and the identification of the data processing system in accordance with a selection sequence;

C. means for storing information received from the data processing systems, and

D. second signal transfer means connected to all said first signal transfer means and said information storage means for transferring information between the selected one of the data processing systems and said storage means through said first signal transfer means.

2. An interconnection unit as recited in claim 1 wherein said first signal transfer means includes:
  i. control status register means for storing control request information, and
  ii. transfer control means connected to said control status register means and responsive to the transfer of control request information from the corresponding data processing system for transferring the control request information into said control status register.

3. An interconnection unit as recited in claim 2 wherein said transfer control means additionally includes:
  i. system transfer means interfacing means connectible to the system transfer means, and
  ii. transceiving means interconnecting said system transfer means interfacing means with said transfer control means thereby to enable the data processing system to be located remotely in the network.

4. An interconnection unit as recited in claim 2 wherein:
A. said request selection means includes:
  i. identifying means connected to each of said first signal transfer means for identifying each data processing system in sequence, and
  ii. control granting means connected to said identifying means, and
B. each said first signal transfer means includes:
  i. latch means as one stage of said control status register means for generating a control request signal,
  ii. generating means for generating a request signal in response to the control request signal and signals from said identifying means in said request selection means that identify the corresponding data processing system, said control granting means being connected to said generating means for halting the identification sequence in response to the request signal.

5. An interconnection unit as recited in claim 4 wherein said generating means in each said first signal transfer means includes signal means for generating signals that uniquely identify the data processing system to which said first transfer means is connected and comparator means responsive to the signals from said signal means and from said identifying means for generating the request signal.

6. An interconnection unit as recited in claim 4 wherein said identifying means includes a counter means and means connected to said counter for incrementing said counter means.

7. An interconnection unit as recited in claim 4 wherein each said first signal transfer means additionally includes ready signal means connected to said latch means, to said generating means and to said control granting means for generating a ready signal in response to signals from said latch means, said generating means and said control granting means.

8. An interconnection unit as recited in claim 7 wherein the control request informaton includes interruption enabling information, said first signal transfer means additionally includes:
  i. second latch means as a second stage of said control status register for responding to said interruption enabling information,
  ii. interruption signal generating means connected to said ready signal means and said second latch means for generating an interruption signal thereby to interrupt the data processing system.

9. An interconnection unit as recited in claim 4 wherein the control request information includes cross system interruption information and each said first signal transfer means includes:
  i. cross interruption enabling means responsive to the receipt of the cross system interruption information for generating a cross interruption enabling signal,
  ii. address means for generating address signals that identify another data processing system that is to be interrupted,
  iii. receiving means connected to all said cross interruption enabling means and said address means for receiving cross interruption enabling signals and the address signals, and
  iv. pending interruption means responsive to the receipt, from annother of said first signal transfer means, of address signals that identify the corresponding data processing system, the cross interruption enabling signal and signals from said selection means that identify the corresponding data processing means for generating an interruption signal, said first signal transfer means coupling the interruption signal onto the system bus thereby to interrupt the identified data processing system identified by the address signals.

10. An interconnection unit as recited in claim 2 wherein said storage means includes a plurality of storage areas each having an address at least one addressed storage location for storing file information and said first transfer means includes:
  i. address latch means as other stages of said control status register for receiving, during a transfer of information to said control status register, address signals that identify a specific storage area,
  ii. means responsive to the address signals from said address latch means and a request from the data processing system for transferring file information to and from said storage areas for transferring the information between the system bus and a specific one of said storage locations.

11. An interconnection unit for interconnecting a plurality of data processing systems wherein each data processing system includes file storage means for storing blocks of information as files and system transfer means connected to the file storage means for controlling the transfer of information, including the file information, system control information and control request information, between the system transfer means and said interconnection unit, said interconnection unit comprising:
   A. a first control section having a control memory means for storing system control information, memory control means for transferring the system control information to and from said control memory means, and system selection means for identifying each of the data processing means in accordance with a selection sequence,
   B. a first data section having a data memory means for storing files, memory control means for transferring files to and from said data memory means, and system selection means for identifying each of the data processing means in accordance with a selection sequence,
   C. a plurality of system interfacing circuit means each said system interfacing means being connectible to the system transfer means in one data processing system for conveying signals to and from the one data processing system,
   D. a plurality of second control sections, each said second control section being connected to a corresponding system interfacing circuit means and to said first control section, including said first control section system selection means, and each said second control section including:
     (i) means responsive to the coincidence of the receipt of control request information from the data processing system through the corresponding system interfacing circuit means and the identification of the corresponding data processing system by said first control section system selection means for transmitting to said first control section system selection means a request for control of said first control section, said first control section system selection means including means for granting control of said first control section in response to the request for control and
     (ii) means for transferring the system control information between the selected one of the data processing systems and said control memory means in said first control section after control of said first control section has been granted to the selected data processing system, and
   E. a plurality of second data sections, each said second data section being connected to a corresponding system interfacing circuit means and to said first data section including said first data section system selection means and each said second data section including:
     (i) means responsive to the coincidence of the receipt of control request information from the data processing system through the corresponding system interfacing circuit means and the selection of the corresponding data processing system by said data section system selection means for transmitting to said first data section system selection means a request for control of said first data section, said first data section system selection means including means for granting control of said first data section in response to the control request and
     (ii) means for transferring the file information between the selected one of the data processing systems and said data memory means in said first data section when control of said first data section has been granted to said selected data processing system.

12. An interconnection unit as recited in claim 11 wherein each of said second control sections and second data sections includes:
   i. control status register means for storing control request information, and
   ii. transfer control means connected to said control status register means and responsive to the transfer of control request information from the corresponding data processing system for transferring the control request information into said control status register.

13. An interconnection unit as recited in claim 12 wherein each said system interfacing circuit means includes:
   i. system transfer means interfacing means connectible to the system transfer means, and
   ii. transceiving means interconnecting said system transfer means interfacing means with each of said second control sections and said second data sections thereby to enable data processing systems to be located remotely in the network.

14. An interconnection unit as recited in claim 12 wherein:
   each said system selection means in said first control and data sections respectively includes:
     i. first and second identifying means connected to each of said second control sections and second data sections respectively for identifying each data processing system in sequence, and
     ii. first and second control granting means connected to said first and second identifying means respectively, and
   each said second control sections and second data sections includes:
     i. latch means as one stage of said control status register means for generating a control request signal,
     ii. generating means for generating a request signal in response to the control request signal and signals from said identifying means in said request selection means connected thereto that identifies the corresponding data processing system, said control granting means being connected to said generating means for halting the corresponding identification sequence in response to the request signal.

15. An interconnection unit as recited in claim 14 wherein each said generating means includes signal means for generating signals that uniquely identify the data processing system and comparator means responsive to the signals from said signal means and from said identifying means for generating the request signal.

16. An interconnection unit as recited in claim 14 wherein each said identifying means includes a counter means and means connected to said counter for incrementing said counter means.

17. An interconnection unit as recited in claim 14 wherein each of said second control sections and said second data sections additionally includes ready signal means connected to said latch means, to said generating means and to said control granting means for generating a ready signal in response to signals from said latch means, said generating means and said control granting means.

18. An interconnection unit as recited in claim 17 wherein the control request information includes interruption enabling information and each of said second control sections and second data sections additionally includes:
  i. second latch means as a second stage of said control status register for responding to said interruption enabling information,
  ii. interruption signal generating means connected to said ready signal means and said second latch means for generating an interruption signal thereby to interrupt the data processing system.

19. An interconnection unit as recited in claim 14 wherein the control request information includes cross system interruption information and each said second control sections and second data sections includes:
  i. cross interruption enabling means responsive to the receipt of the cross system interruption information for generating a cross interruption enabling signal,
  ii. address means for generating address signals that identify another data processing system that is to be interrupted,
  iii. receiving means connected to all said cross interruption enabling means and said address means for receiving cross interruption enabling signals and the address signals, and
  iv. pending interruption means responsive to the receipt, from another of said first transfer means, of address signals that idenfity the corresponding data processing system, the cross interruption enabling signal and signals from said corresponding system selection means that identify the corresponding data processing system for generating an interruption signal, said system interfacing circuit means coupling the interruption signal onto the system bus thereby to interrupt the identified data processing system identified by the address signals.

20. An interconnection unit as recited in claim 12 wherein each said memory means includes a plurality of storage areas each having an address at least one addressed storage location for storing information and each of said second control sections and said second data sections includes:
  i. address latch means as other stages of said control status register for receiving, during a transfer of information to said control status register, address signals that identify a specific storage area,
  ii. means responsive to the address signals from said address latch means and a request from the data processing system for transferring information to and from said storage areas for transferring the information between the system bus and a specific one of said storage locations.

* * * * *

UNITED STATES PATENT AND TRADEMARK OFFICE
CERTIFICATE OF CORRECTION

PATENT NO. : 4,204,251                    Page 1 of 2
DATED      : May 20, 1980
INVENTOR(S): Finn Brudevold It is certified that error appears in the above-identified patent and that said Letters Patent are hereby corrected as shown below:

Abstract, line 8, delete "an".
Abstract, line 9, delete "other" and insert --another--.
Column 2, line 21, delete "therefor" and insert --therefore--.
Column 2, line 21, delete "can".
Column 2, line 22, delete "not" and insert --cannot--.
Column 3, line 29, delete "constrution" and insert --construction--.
Column 4, line 24, delete "artibrates" and insert --arbitrates--.
Column 4, line 52, delete "had" and insert --has--.
Column 5, line 44, delete "a" and insert --b--.
Column 6, line 52, delete "stages" (second occurrence) and insert --latch--.
Column 6, line 53, delete "latch" and insert --stages--.
Column 9, line 26, delete "BMYSN" and insert --BMSYN--.
Column 10, line 37, delete "can not" and insert --cannot--.
Column 11, line 31, delete "can not" and insert --cannot--.
Column 14, line 30, delete "DGRANT" and insert --D GRANT--.
Column 14, line 38, delete "receives" and insert --retrieves--.
Column 16, line 9, before "bus" delete "a".
Column 16, line 34, after "processing" insert --system--.
Column 16, line 38, delete "repect" and insert --respect--.
Column 16, line 40, delete "wll" and insert --will--.
Column 17, line 7, delete "informaton" and insert --information--.
Column 18, line 3, after "first" insert --signal--.
Column 18, line 19, delete "informaton" and insert --information--.

UNITED STATES PATENT AND TRADEMARK OFFICE
CERTIFICATE OF CORRECTION

PATENT NO. : 4,204,251
DATED : May 20, 1980
INVENTOR(S) : Finn Brudevold

It is certified that error appears in the above-identified patent and that said Letters Patent are hereby corrected as shown below:

Column 18, line 44, delete "annother" and insert --another--.
Column 22, line 5, delete "idenfity" and insert --identify--.

Signed and Sealed this

Fourth Day of November 1980

[SEAL]

Attest:

SIDNEY A. DIAMOND

Attesting Officer

Commissioner of Patents and Trademarks